US012612220B2

(12) United States Patent
Christie et al.

(10) Patent No.: US 12,612,220 B2
(45) Date of Patent: Apr. 28, 2026

(54) CONTAINER CLOSURE SYSTEM AND SEALING ASSEMBLIES FOR MAINTAINING SEAL INTEGRITY AT LOW STORAGE TEMPERATURES

(71) Applicant: CORNING INCORPORATED, Corning, NY (US)

(72) Inventors: Dane Alphanso Christie, Painted Post, NY (US); Adam Robert Sarafian, Corning, NY (US); Jiangtao Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 759 days.

(21) Appl. No.: 17/896,850

(22) Filed: Aug. 26, 2022

(65) Prior Publication Data

US 2023/0072233 A1 Mar. 9, 2023

Related U.S. Application Data

(60) Provisional application No. 63/239,226, filed on Aug. 31, 2021.

(51) Int. Cl.

| | |
|---|---|
| ***B65D 45/18*** | (2006.01) |
| ***A61J 1/20*** | (2006.01) |
| ***B65D 39/00*** | (2006.01) |

(52) U.S. Cl.

CPC .............. *B65D 45/18* (2013.01); *A61J 1/201* (2015.05); *B65D 39/0052* (2013.01); (Continued)

(58) Field of Classification Search

USPC ................ 215/294, 296, 297, 298, 299, 300
See application file for complete search history.

(56) References Cited

U.S. PATENT DOCUMENTS

| | | | |
|---|---|---|---|
| 3,653,528 | A | 4/1972 | Wimmer |
| 3,659,736 | A | 5/1972 | Riggs |

(Continued)

FOREIGN PATENT DOCUMENTS

| | | | |
|---|---|---|---|
| CA | 3138450 | A1 | 11/2020 |
| CN | 101287553 | A | 10/2008 |

(Continued)

OTHER PUBLICATIONS

International Search Report and Written Opinion of the International Searching Authority; PCT/US22/41311; mailed on Nov. 22, 2022, 14 pages; European Patent Office.

(Continued)

*Primary Examiner* — Thomas J Kessler
(74) *Attorney, Agent, or Firm* — Michael G. Panian

(57) ABSTRACT

A sealed pharmaceutical container comprises a flange comprising an underside surface, an outer surface extending from the underside surface, the outer surface defining an outer radius $r_o$ of the flange; and an upper surface extending between the outer surface and an inner surface defining an opening in the sealed pharmaceutical container. The upper surface comprises a sealing region extending between the opening and the outer surface and comprising a radius $r_{sr}$ that is less than $r_o$. The sealed pharmaceutical container also comprises a sealing assembly comprising sealing portion in contact with the upper surface at a lower surface of the sealing portion and a cap compressing the stopper against the upper surface. After compression, the sealing portion of the stopper comprises a compressed radius $r_{sc}$ that is less than $r_{sr}$ adjacent the upper surface.

19 Claims, 7 Drawing Sheets

(52) U.S. Cl.
CPC .................. *B65D 2539/003* (2013.01); *B65D 2543/00092* (2013.01); *B65D 2543/00953* (2013.01)

(56) References Cited

U.S. PATENT DOCUMENTS

| | | | | |
|---|---|---|---|---|
| 4,089,432 | A | 5/1978 | Crankshaw et al. | |
| 4,205,754 | A | 6/1980 | Jarsskov et al. | |
| 4,244,478 | A | 1/1981 | Handman | |
| 4,664,277 | A | 5/1987 | Connor | |
| 5,064,083 | A | 11/1991 | Alexander et al. | |
| 5,772,057 | A | 6/1998 | Finneran | |
| 5,803,284 | A | 9/1998 | Grimard | |
| 5,817,082 | A | 10/1998 | Niedospial, Jr. et al. | |
| 5,902,298 | A | 5/1999 | Niedospial et al. | |
| 6,090,093 | A | 7/2000 | Thibault et al. | |
| 6,602,206 | B1 | 8/2003 | Niermann et al. | |
| 6,645,635 | B2 | 11/2003 | Muraki | |
| 7,282,269 | B2 | 10/2007 | Wang et al. | |
| 8,092,878 | B2 | 1/2012 | Miller et al. | |
| 8,497,004 | B2 | 7/2013 | Davis et al. | |
| 8,544,665 | B2 | 10/2013 | Bogle et al. | |
| 8,551,898 | B2 | 10/2013 | Danielson et al. | |
| 8,684,206 | B2 | 4/2014 | Kawachi | |
| 9,080,044 | B2 | 7/2015 | Muto | |
| 9,145,329 | B2 | 9/2015 | Drake et al. | |
| 10,780,021 | B2 | 9/2020 | Weikart et al. | |
| 11,168,019 | B2 | 11/2021 | Schaut et al. | |
| 2002/0023409 | A1 | 2/2002 | Py | |
| 2002/0166326 | A1 | 11/2002 | Giesy et al. | |
| 2004/0217081 | A1 | 11/2004 | Konrad | |
| 2007/0102393 | A1 | 5/2007 | Colin et al. | |
| 2007/0246468 | A1 | 10/2007 | Miller et al. | |
| 2009/0145427 | A1 | 6/2009 | Groeger et al. | |
| 2009/0216212 | A1* | 8/2009 | Fangrow, Jr. | A61J 1/2096 604/406 |
| 2010/0236659 | A1 | 9/2010 | Py et al. | |
| 2010/0273049 | A1 | 10/2010 | Vidal et al. | |
| 2015/0211950 | A1 | 7/2015 | Eckhoff et al. | |
| 2015/0344557 | A1 | 12/2015 | Malik et al. | |
| 2016/0009460 | A1 | 1/2016 | Fournier et al. | |
| 2016/0075485 | A1 | 3/2016 | Masuyama et al. | |
| 2016/0324723 | A1 | 11/2016 | Lippert et al. | |
| 2018/0257975 | A1 | 9/2018 | Kimura et al. | |
| 2020/0146280 | A1 | 5/2020 | Silverman et al. | |
| 2020/0271541 | A1* | 8/2020 | Mathaes | G01M 3/229 |
| 2021/0212893 | A1 | 7/2021 | Christie et al. | |
| 2022/0168185 | A1 | 6/2022 | Redkar et al. | |
| 2022/0226191 | A1* | 7/2022 | Folta | B65D 51/002 |
| 2022/0339067 | A1 | 10/2022 | Christie et al. | |

FOREIGN PATENT DOCUMENTS

| | | | |
|---|---|---|---|
| EP | 0267433 | A2 | 5/1988 |
| EP | 3708137 | A1 | 9/2020 |
| FR | 2558444 | A1 | 7/1985 |
| JP | 10-179688 | A | 7/1998 |
| JP | 2010-209157 | A | 9/2010 |
| WO | 2013/034594 | A1 | 3/2013 |
| WO | 2020/112634 | A1 | 6/2020 |
| WO | 2020/231474 | A2 | 11/2020 |
| WO | 2021/042090 | A2 | 3/2021 |
| WO | 2021/162984 | A1 | 8/2021 |
| WO | 2023/034088 | A1 | 3/2023 |

OTHER PUBLICATIONS

"Aluminum, Al", MatWeb, Retrieved from; https://www.matweb.com/search/DataSheet.aspx?MatGUID=0cd1edf33ac145ee93a0aa6fc666c0e0, 2017, 3 pages.

"Overview of Materials for Silicone Rubber", MatWeb, Retrieved from: https://www.matweb.com/search/DataSheet.aspx?MatGUID=cbe7a469897a47eda563816c86a73520 , Dec. 2017, 4 pages.

Melito, "Seal Selection and Thermal Exapansion", Elasto Proxy, Retrieved from: https://www.elastoproxy.com/seal-selection-and-thermal-expansion, 2013, 3 pages.

Zhao et al., "Study on Optimization of Damping Performance and Damping Temperature Range of Silicone Rubber by Polyborosiloxane Gel", Polymers, 2020, 13 pages.

"Molding Innovation into healthcare packaging", Retrieved from: https://www.araymond-life.com/en, ARaymond Life + Schott plastic cap for cold storage CCI presentation at PDA Conference (Mar. 2020), 4 pages.

International Search Report and Written Opinion of the International Searching Authority; PCT/US2024/029817; dated Sep. 25, 2024; 12 pages; European Patent Office.

Brigitte Zuleger et al., Container/Closure Integrity Testing and the Identification of a Suitable Vial/Stopper Combination for Low-Temperature Storage at −80° C., 2012, PDA JPST, vol. 66, Abstract (Year: 2012).

Duncan et al., Correlating Vial Seal Tightness to Container Closure Integrity at Various Storage Temperatures, Aug. 25, 2015, available at https://www.pharmaceuticalonline.com/doc/correlating-vial-seal-tightness-to-container-closure-integrity-at-various-storage-temperatures-0001. pp. 1-31.

Ethylene-Propylene Rubbers & Elastomers, Apr. 20, 2012, International Institute of Synthetic Rubber Producers, Inc. (Year: 2012).

Hagart-Alexander, C., Temperature Measurement, 2010, Elsevier Inc., pp. 269-271 (Year: 2010).

Iacocca, R., "Primary container design for drug substance and drug substance at Cryo- and cold temperatures," Presented at the 2019 PDA Europe Parenteral Packaging, Venice, Italy, Mar. 19, 2019. pp. 1-22.

International Search Report and Written Opinion of the International Searching Authority; PCT/US2021/058243; mailed on Jun. 1, 2022, 19 pages; European Patent Office.

International Search Report and Written Opinion of the International Searching Authority; PCT/US2022/025278; mailed on Jul. 25, 2022, 13 pages; European Patent Office.

Invitation to Pay Additional Fees; PCT/US21/58243; dated Feb. 22, 2020; p. 10; International Searching Authority.

Mathaes, R., et al. (2016). "The pharmaceutical vial capping process: Container closure systems, capping equipment, regulatory framework, and seal quality tests", Elsevier, Eur J Pharm Biopharm 99 (2016) 54-64. DOI: http://dx.doi.org/10.1016/j.ejpb.2015.11.016.

Nieto, A. and H. Roehl (2018). "Sealing Behaviour of Container Closure Systems under Frozen Storage Conditions: Nonlinear Finite Element Simulation of Serum Rubber Stoppers." PDA J Pharm Sci and Tech (2018), 72(4): 367-381. DOI: 10.5731/pdajpst.2017.008391.

Sircoulomb et al., "Cryogenic Storage Challenges for Container-Closure Systems," Mar. 25, 2020, available at https://www.pda.org/pda-letter-portal/home/full-article/cryogenic-storage-challenges-for-container-closure-systems. pp. 1-7.

* cited by examiner

CONTAINER CLOSURE SYSTEM AND SEALING ASSEMBLIES FOR MAINTAINING SEAL INTEGRITY AT LOW STORAGE TEMPERATURES

CROSS-REFERENCE TO RELATED APPLICATIONS

This application claims the benefit of priority under 35 U.S.C. § 119 of U.S. Provisional Application Ser. No. 63/239,226 filed on Aug. 31, 2021, the content of which is relied upon and incorporated herein by reference in its entirety.

FIELD

The present specification generally relates to container closure systems, such as glass containers for storing pharmaceutical compositions and stoppers for sealing off the glass containers.

TECHNICAL BACKGROUND

Pharmaceutical containers, such as vials and syringes, are typically sealed via a stopper or other closure to preserve the integrity of the contained material. Closures are typically made of synthetic rubbers and other elastomers. Such materials beneficially have high permeation resistance and elasticity to facilitate insertion into the container to seal the container's interior. The elasticity of typically-used closure materials, however, may reduce at low temperatures. For example, synthetic rubbers currently in use as material closures may comprise transition temperatures that are greater than or equal to −70° C. and less than or equal to −30° C. Below the transition temperature, closures constructed of such synthetic rubbers may behave as a solid and be unable to expand elastically to compensate for the relatively large difference between coefficients of thermal expansion of the glass and a crimping cap used to secure the closure to the container. Given this, existing sealing assemblies for pharmaceutical containers may fail at temperatures less than or equal to −30° C.

Some biological materials (e.g., blood, serum, proteins, stem cells, and other perishable biological fluids) require storage at temperatures below the glass transition temperatures of conventional elastomers to remain useful. For example, certain RNA-based vaccines may require storage at dry-ice temperatures (e.g., approximately −80° C.) or liquid nitrogen temperatures (e.g., approximately −180° C.) to remain active. Such low temperatures may result in dimensional changes in the closure components (e.g., the glass or polymer container, the stopper, an aluminium cap), leading to issues in the integrity of the seal, and potential contamination of the material stored therein.

SUMMARY

A first aspect of the present disclosure includes a sealed pharmaceutical container comprising: a shoulder; a neck extending from the shoulder; and a flange extending from the neck, the flange comprising: an underside surface extending from the neck; an outer surface extending from the underside surface, the outer surface defining an outer radius $r_o$ of the flange; and an upper surface extending between the outer surface and an inner surface defining an opening in the sealed pharmaceutical container, wherein the upper surface comprises: a sealing region extending between the opening and the outer surface, wherein the sealing region comprises a radius $r_{sr}$ that is less than $r_o$; and a transition region extending between the sealing region and the outer surface; and a sealing assembly comprising: a stopper comprising an insertion portion inserted into the opening and a sealing portion in contact with the upper surface at a lower surface of the sealing portion; and a cap compressing the stopper against the upper surface, wherein the sealing portion of the stopper comprises a compressed radius $r_{sc}$ that is less than $r_{sr}$ adjacent the upper surface.

A second aspect of the present disclosure includes a sealed pharmaceutical container according to the first aspect, wherein the sealing portion comprises a sealing surface that is disposed on the sealing region of the upper surface, the sealing surface comprising at least a portion that conforms in shape to the sealing region as a result of the cap compressing the stopper against the upper surface.

A third aspect of the present disclosure includes a sealed pharmaceutical container according to any of the first through the second aspects, wherein the sealing surface comprises an outer peripheral edge that is disposed radially inward of the transition region on the sealing region.

A fourth aspect of the present disclosure includes a sealed pharmaceutical container according to any of the first through the third aspects, wherein the outer peripheral edge of the sealing surface is disposed radially outward of an inner edge of the sealing region.

A fifth aspect of the present disclosure includes a sealed pharmaceutical container according to any of the first through the fourth aspects, wherein the compression is maintained on the upper surface when the sealed pharmaceutical container is cooled to a temperature of less than or equal to −45° C. such that a helium leakage rate of the sealed pharmaceutical container is less than or equal to $1.4\times10^{-6}$ $cm^3/s$ at the temperature.

A sixth aspect of the present disclosure includes a sealed pharmaceutical container according to any of the first through the fifth aspects, wherein the stopper is compressed against the upper surface by the cap such that the stopper applies a residual seal force to the upper surface that is less than 20 lbfs.

A seventh aspect of the present disclosure includes a sealed pharmaceutical container according to any of the first through the second aspects, wherein the stopper is compressed against the upper surface by the cap such that the stopper applies a residual seal force to the upper surface that is less than 15 lbfs.

An eighth aspect of the present disclosure includes a sealed pharmaceutical container according to any of the first through the seventh aspects, wherein a second contact area between the sealing portion and the upper surface when the sealed pharmaceutical container is cooled to −80° C. is at least about 10% of a first contact area between the sealing portion and the upper surface when the sealed pharmaceutical container is at room temperature.

A ninth aspect of the present disclosure includes a sealed pharmaceutical container according to any of the first through the eighth aspects, wherein a second contact area between the sealing portion and the upper surface when the sealed pharmaceutical container is cooled to −180° C. and a second contact area between the sealing portion and the upper surface when the sealed pharmaceutical container is at room temperature is greater than or equal to 10.0%.

A tenth aspect of the present disclosure includes a sealed pharmaceutical container according to any of the first through the ninth aspects, wherein the sealing portion comprises a non-uniform radial dimension.

An eleventh aspect of the present disclosure includes a sealed pharmaceutical container according to any of the first through the tenth aspects, wherein the sealing portion comprises a stepwise transition in radial dimension at a location that is axially offset from the upper surface.

A twelfth aspect of the present disclosure includes a sealed pharmaceutical container according to any of the first through the second aspects, wherein the sealing portion of the stopper comprises: a contacting lower portion that contacts the upper surface of the flange; and an upper portion that directly contacts the cap, wherein: the upper portion comprises a radial dimension $r_{up}$ that is greater than the compressed radius $r_{sc}$ such that at least a portion of the upper portion extends axially over the transition region, and the contacting lower portion comprises a radial dimension that is less than $r_{up}$.

A thirteenth aspect of the present disclosure includes a sealed pharmaceutical container according to any of the first through the twelfth aspects, wherein: the outer radius $r_o$ of the flange equals 6.5 mm, and a contact area between the upper surface and the sealing portion is greater than or equal to 75 $mm^2$ when the sealed pharmaceutical container is cooled to a temperature of less than or equal to −80°.

A fourteenth aspect of the present disclosure includes a sealed pharmaceutical container comprising: a central axis, an opening; a flange circumferentially surrounding the opening, the flange comprising: an underside surface extending from the neck; an outer surface extending from the underside surface, the outer surface defining an outer radius $r_o$ of the flange; an upper surface, wherein, in a cross-section of the sealed pharmaceutical container taken through a plane extending parallel to and through the central axis, the upper surface comprises a first linear section disposed on a first side of the opening and a second linear section disposed on the second side of the opening, wherein outer ends of the first and second linear sections are disposed a distance $2*r_{sr}$ apart from one another in a direction perpendicular to the central axis; and a transition region extending between the upper surface and the outer surface; and a sealing assembly comprising: a stopper comprising an insertion portion inserted into the opening and a sealing portion in contact with the upper surface; and a cap compressing the stopper against the upper surface, wherein the sealing portion comprises a compressed radius $r_{sc}$ that is less than $r_{sr}$ adjacent the upper surface.

A fifteenth aspect of the present disclosure includes a sealed pharmaceutical container according to the fourteenth aspect, wherein the first and second linear sections of the cross section extend at angles relative to a plane extending perpendicular to the central axis and are portions of a conical section of the upper surface.

A sixteenth aspect of the present disclosure includes a sealed pharmaceutical container according to any of the first through the sixteenth aspects, wherein the sealing portion comprises a sealing surface that is disposed on the first and second linear sections.

A seventeenth aspect of the present disclosure includes a sealed pharmaceutical container according to any of the fourteenth through the fifteenth aspects, wherein the sealing surface comprises an outer peripheral edge that is disposed radially inward of the transition region.

An eighteenth aspect of the present disclosure includes a sealed pharmaceutical container according to any of the fourteenth through the seventeenth aspects, wherein the outer peripheral edge of the sealing surface is disposed radially outward of inner ends of the first and second linear sections.

A nineteenth aspect of the present disclosure includes a sealed pharmaceutical container according to any of the fourteenth through the eighteenth aspects, wherein the compression is maintained on the upper surface when the sealed pharmaceutical container is cooled to a temperature of less than or equal to −45° C. such that a helium leakage rate of the sealed pharmaceutical container is less than or equal to $1.4\times10^{-6}$ $cm^3/s$ at the temperature.

A twentieth aspect of the present disclosure includes a sealed pharmaceutical container according to any of the fourteenth through the nineteenth aspects, wherein the stopper is compressed against the upper surface by the cap such that the stopper applies a residual seal force to the upper surface that is less than 20 lbfs.

A twenty first aspect of the present disclosure includes a sealed pharmaceutical container according to any of the fourteenth through the twentieth aspects, wherein the stopper is compressed against the upper surface by the cap such that the stopper applies a residual seal force to the upper surface that is less than 15 lbfs.

A twenty second aspect of the present disclosure includes a sealed pharmaceutical container according to any of the fourteenth through the twenty first aspects, wherein a second contact area between the sealing portion and the upper surface when the sealed pharmaceutical container is cooled to −80° C. is at least about 10% of a first contact area between the sealing portion and the upper surface when the sealed pharmaceutical container is at room temperature.

A twenty third aspect of the present disclosure includes a sealed pharmaceutical container according to any of the fourteenth through the twenty second aspects, wherein a second contact area between the sealing portion and the upper surface when the sealed pharmaceutical container is cooled to −180° C. and a second contact area between the sealing portion and the upper surface when the sealed pharmaceutical container is at room temperature is greater than or equal to 10.0%.

A twenty fourth of the present disclosure includes a sealed pharmaceutical container according to any of the fourteenth through the twenty third aspects, wherein the sealing portion comprises a non-uniform radial dimension.

A twenty fifth aspect of the present disclosure includes a sealed pharmaceutical container according to any of the fourteenth through the fourth aspects, wherein the sealing portion comprises a stepwise transition in radial dimension at a location that is axially offset from the upper surface.

A twenty sixth aspect of the present disclosure includes a sealed pharmaceutical container according to any of the fourteenth through the twenty fifth aspects, wherein the sealing portion of the stopper comprises: a contacting lower portion that contacts the upper surface of the flange; and an upper portion that directly contacts the cap, wherein: the upper portion comprises a radial dimension $r_{up}$ that is greater than the compressed radius $r_{sc}$ such that at least a portion of the upper portion extends axially over the transition region, and the contacting lower portion comprises a radial dimension that is less than $r_{up}$.

A twenty seventh aspect of the present disclosure includes a sealed pharmaceutical container according to any of the fourteenth through the twenty sixth aspects, wherein: the outer radius $r_o$ of the flange equals 6.5 mm, and a contact area between the upper surface and the sealing portion is greater than or equal to 75 $mm^2$ when the sealed pharmaceutical container is cooled to a temperature of less than or equal to −80°.

A twenty eighth aspect of the present disclosure includes a method of sealing a sealed pharmaceutical container, the method comprising the steps of: providing a sealed pharmaceutical container comprising a shoulder, a neck extending from the shoulder, and a flange extending from the neck, the flange comprising: an underside surface extending from the neck; an outer surface extending from the underside surface, the outer surface defining an outer diameter of the flange; and an upper surface extending between the outer surface to an inner surface of the sealed pharmaceutical container that defines an opening, the upper surface comprising a sealing region having a radius $r_{sr}$; inserting a pharmaceutical composition into the sealed pharmaceutical container; providing a sealing assembly comprising a stopper, the stopper comprising an insertion portion and a sealing portion; crimping a metal-containing cap over the stopper and against flange to thereby compress the sealing portion against the upper surface, wherein, prior to being compressed by the metal-containing cap, the sealing portion comprises an uncompressed radius rue at a lower edge of the sealing portion that is less than or equal to $0.85*r_{sr}$; and cooling the sealed pharmaceutical container to a temperature of less than or equal to −45° C., wherein, after the cooling of the sealed pharmaceutical container, the compression is maintained on the upper surface such that a helium leakage rate of the sealed pharmaceutical container is less than or equal to $1.4\times10^{-6}$ $cm^3/s$ at the temperature.

A twenty ninth aspect of the present disclosure includes a method according to the twenty eighth aspect, wherein, once compressed by the metal-containing cap, the sealing portion comprises a compressed radius $r_{sc}$ that is less than $r_o$.

A thirtieth aspect of the present disclosure includes a method according to any of the twenty eighth to the twenty ninth aspects, wherein the metal-containing cap is crimped such that the stopper is compressed against the upper surface to provide a residual sealing force of less than or equal to 20 lbf.

A thirty first aspect of the present disclosure includes a method according to any of the twenty eighth to the thirtieth aspects, wherein a second contact area between the sealing portion and the upper surface when the sealed pharmaceutical container is cooled to −80° C. is at least about 10% of a first contact area between the sealing portion and the upper surface when the sealed pharmaceutical container is at room temperature.

A thirty second aspect of the present disclosure includes a method according to any of the twenty eighth to the thirty first aspects, wherein a second contact area between the sealing portion and the upper surface when the sealed pharmaceutical container is cooled to −180° C. and a second contact area between the sealing portion and the upper surface when the sealed pharmaceutical container is at room temperature is greater than or equal to 10.0%.

A thirty third aspect of the present disclosure includes a method according to any of the twenty eighth to the thirty second aspects, wherein the temperature is less than or equal to −80° C.

A thirty fourth aspect of the present disclosure includes a method according to any of the twenty eighth to the thirty third aspects, wherein the temperature is less than or equal to −180° C.

A thirty fifth aspect of the present disclosure includes a method according to any of the twenty eighth to the thirty fourth aspects, wherein: the upper surface further comprises a transition region extending between the sealing region and the outer surface of the flange, and the sealing portion comprises a sealing surface that contacts the sealing region, and an outer peripheral edge of the sealing surface does not contact the transition region as a result of the compression of the stopper.

A thirty sixth aspect of the present disclosure includes a method according to any of the twenty eighth to the thirty fifth aspects, wherein the sealing portion comprises a non-uniform radial dimension.

A thirty seventh aspect of the present disclosure includes a method according to any of the twenty eighth to the thirty sixth aspects, wherein the sealing portion comprises a step-wise transition in radial dimension at a location that is axially offset from the upper surface.

A thirty eighth aspect of the present disclosure includes a method according to any of the twenty eighth to the thirty seventh aspects, wherein the sealing portion of the stopper comprises: a contacting lower portion that contacts the upper surface of the flange; and an upper portion that directly contacts the cap, wherein: the upper portion comprises a radial dimension $r_{up}$ that is greater than the compressed radius $r_{sc}$ such that at least a portion of the upper portion extends axially over the transition region, and the contacting lower portion comprises a radial dimension that is less than $r_{up}$.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
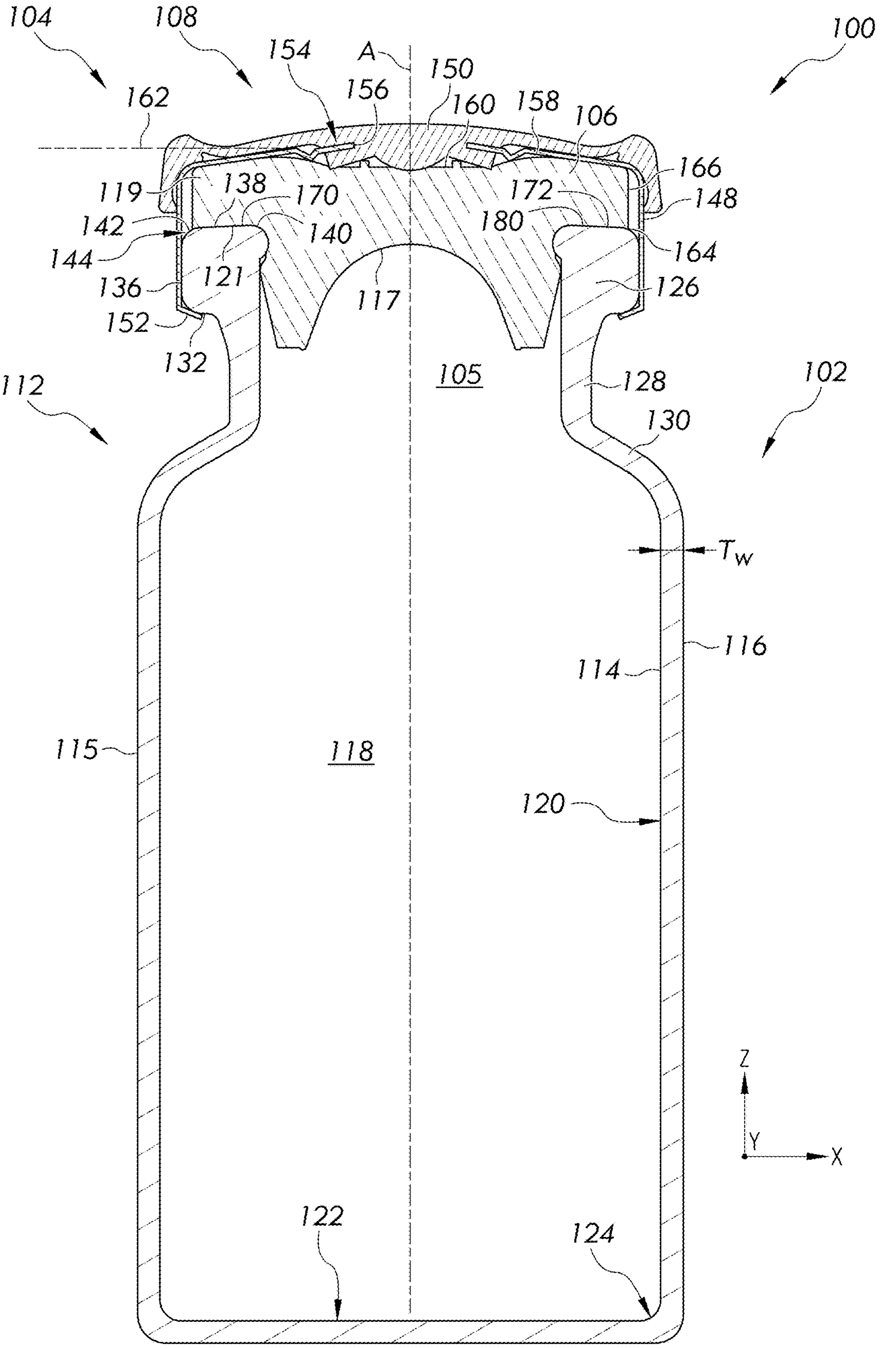
FIG. 1A schematically depicts a cross-sectional view of a sealed pharmaceutical container, according to one or more embodiments described herein.

Reference will now be made in detail to embodiments of sealed pharmaceutical containers comprising sealing assemblies that maintain container closure integrity at relatively low storage temperatures (e.g., less than or equal to −30° C., less than or equal to −40° C., less than or equal to −50° C., less than or equal to −60° C., less than or equal to −70° C., less than or equal to −80° C., less than or equal to −100° C., less than or equal to −125° C., less than or equal to −150° C., less than or equal to −175° C., −180° C.). To facilitate maintenance of container closure integrity at such low storage temperatures, a sealed glass container described herein may comprise a glass container and a stopper that is specifically designed based on the structure of the glass container to provide improved sealing performance over certain existing combinations of containers and stoppers. A stopper in accordance with the present disclosure may comprise an insertion portion designed to be inserted into an opening of the glass container and a sealing portion that contacts an upper surface of a glass container to form a seal. The sealing portion may comprise a radial dimension that is selected such that, when the stopper is compressed against the upper surface after capping, the sealing portion comprises a radial dimension $r_{sc}$ that is less than or equal to a radial dimension $r_{sr}$ associated with a sealing region of the upper surface of the glass container. As a result, an outer peripheral edge of the sealing portion adjacent the flange may be disposed radially inward of an outer edge of the sealing region. The outer peripheral edge may lie in contact with the sealing region of the upper surface. The sealing region may be constructed to have properties (e.g., comprise an Ra value of less than or equal 5 nm and/or be free of surface height deviations of greater than or equal to 5 μm) that are conducive to establishing a uniform distribution of contact pressure between the stopper and the upper surface. Such a uniform contact pressure may aid in maintaining a relatively high contact area (e.g., greater than or equal to 75 $mm^2$ for a 13 mm vial) between the stopper and upper surface when the container is cooled to relatively low storage temperatures, thereby increasing the probability of maintaining container closure integrity.

The stoppers described herein may also facilitate maintaining container closure integrity at low storage temperatures with lower amounts of stopper compression during crimping processes than those used with certain existing sealed containers. Existing pharmaceutical containers may be sealed with crimping processes resulting in residual seal forces that are greater than 20 lbf (e.g., greater than or equal to 25 lbf, resulting in compression of the stopper that is greater than 10% and less than or equal to 20%). The improved seals provided by the stoppers described herein may be capable of maintaining container closure integrity at lower residual forces (e.g., resulting in the stopper having a residual nominal strain of less than or equal to 8% after crimping). Such a reduction in residual seal force may facilitate use of more simple and efficient crimping processes, thereby lowering production costs. Lower residual forces used during capping may also reduce the risk of over-compressing the stopper during capping. Existing sealing assemblies may rely on increasing stopper compression to maintain container closure integrity at low storage temperatures. Such increased stopper compression may result in damage to the vial. By facilitating quality seals without excessive stopper compression, the sealing assemblies described herein may reduce the risk of vial damage.

As used herein, the term "surface roughness" refers to an Ra value or an Sa value. An Ra value is a measure of the arithmetic average value of a filtered roughness profile determined from deviations from a centerline of the filtered roughness. For example, an Ra value may be determined based on the relation:

$$Ra = \frac{1}{n}\sum_{i=1}^{n} |H_i - H_{CL}| \quad (1)$$

where $H_i$ is a surface height measurement of the surface and $H_{CL}$ corresponds to a centerline (e.g., the center between maximum and minimum surface height values) surface height measurement among the data points of the filtered profile. An Sa value may be determined through a real extrapolation of equation 1 herein. Filter values (e.g., cutoff wavelengths) for determining the Ra or Sa values described herein may be found in ISO 25718 (2012). Surface height may be measured with a variety of tools, such as an optical interferometer, stylus-based profilometer, or laser confocal microscope. To assess the roughness of surfaces described herein (e.g., sealing surfaces or portions thereof), measurement regions should be used that are as large as is practical, to assess variability that may occur over large spatial scales.

As used herein, the term "container closure integrity" refers to maintenance of a seal at an interface between a glass container and a sealing assembly (e.g., between a sealing surface of a glass container and a stopper) that is free of gaps above a threshold size to maintain a probability of contaminant ingress or reduce the possibility of gas permeability below a predetermined threshold based on the material stored in a glass container. For example, in embodiments, a container closure integrity is maintained if a helium leakage rate during a helium leak test described in USP <1207> (2016) at less than or equal to $1.4\times10^{-6}$ $cm^3/s$.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1A, one embodiment of a sealed pharmaceutical container 100 for storing a pharmaceutical formulation is schematically depicted in cross section. The sealed pharmaceutical container 100 comprises a glass container 102 and a sealing assembly 104 coupled to the glass container 102 via an opening 105 of the glass container 102. The glass container 102 generally comprises a body 112. The body 112 extends between an inner surface 114 and an outer surface 116 of the glass container 102, includes a central axis A, and generally encloses an interior volume 118. In the embodiment of the glass container 102 shown in FIG. 1A, the body 112 generally comprises a wall portion 120 and a floor portion 122. The wall portion 120 transitions into the floor portion 122 through a heel portion 124. In the depicted embodiment, the glass container 102 includes a flange 126, a neck 128 extending from the flange 126, a barrel 115, and a shoulder 130 extending between the neck 128 and the barrel 115. In embodiments, the glass container 102 is axisymmetric about a central axis A, with each of the barrel 115, neck 128, and flange 126, being substantially cylindrical-shaped. The body 112 has a wall thickness $T_W$ which extends between the inner surface 114 to the outer surface 116, as depicted in FIG. 1A.

In embodiments, the glass container 102 may be formed from Type I, Type II or Type III glass as defined in USP <660>, including borosilicate glass compositions such as Type 1B borosilicate glass compositions under USP <660>. Alternatively, the glass container 102 may be formed from alkali aluminosilicate glass compositions that otherwise satisfies Type I criteria, such as those disclosed in U.S. Pat. No. 8,551,898, hereby incorporated by reference in its entirety, or alkaline earth aluminosilicate glasses such as those described in U.S. Pat. No. 9,145,329, hereby incorporated by reference in its entirety. In embodiments, the glass container 102 may include a coating such as a heat tolerant coating disclosed in U.S. Pat. No. 10,0273,049, hereby incorporated by reference in its entirety. In embodiments, the glass container 102 may be constructed from a soda lime glass composition. In embodiments, the glass container 102 is constructed of a glass composition having a coefficient of thermal expansion that is greater than or equal to $0\times10^{-7}$/K and less than or equal to $100\times10^{-7}$/K (e.g., greater than or equal to $30\times10^{-7}$/K and less than or equal to $70\times10^{-7}$/K).

The wall thickness $T_W$ of the glass container 102 may vary depending on the implementation. In embodiments, the wall thickness $T_W$ of the glass container 102 may be from less than or equal to 6 millimetres (mm), such as less than or equal to 4 mm, less than or equal to 2 mm, less than or equal to 1.5 mm or less than or equal to 1 mm. In some embodiments, the wall thickness $T_W$ may be greater than or equal to 0.1 mm and less than or equal to 6 mm, greater than or equal to 0.3 mm and less than or equal to 4 mm, greater than or equal to 0.5 mm and less than or equal to 4 mm, greater than or equal to 0.5 mm and less than or equal to 2 mm, or greater than or equal to 0.5 mm and less than or equal to 1.5 mm. In embodiments, the wall thickness $T_W$ may be greater than or equal to 0.9 mm and less than or equal to 1.8 mm. The wall thickness $T_W$ may vary depending on the axial location within the glass container 102.

As depicted in FIG. 1A, the flange 126 comprises an underside surface 132, an outer flange surface 136, and an upper surface 138. The outer flange surface 136 is a portion of the outer surface 116 of the glass container 102. The outer flange surface 136 may define an outer diameter of the flange 126. In embodiments, the outer diameter is 13 mm, 20 mm, or between 13 mm and 20 mm. Any size glass container (e.g., 2R vials, 4R vials, 8R vials, 15R vials, 20R vials, 25R vials, 30R vials, 50R vials, and 100R vials, in accordance with ISO 8362-1). The upper surface 138 may define a sealing region 180 of the outer surface 116 of the glass container 102. The sealing region 180 may extend radially between an inner edge 140 and an outer edge 142 of the upper surface 138. In embodiments, the sealing region 180 comprises a conical region of the outer surface 116 (e.g., where the outer surface 116 follows a conical profile). extending between the inner and outer edges 140, 142. In embodiments, within the sealing region 180, the upper surface 138 comprises a relatively low surface roughness (e.g., an Ra value of less than or equal 5 μm) and is free of surface defects and surface height deviations of greater than or equal to 5 μm. Such uniformity of the upper surface 138 beneficially facilitates maintaining contact between the upper surface 138 and a stopper (e.g., the stopper 106 described herein) to maintain a seal when the glass container 102 is cooled to relatively low temperatures (e.g., to less than or equal to −45° C., less than or equal to −80° C., less than or equal to −180° C.). In embodiments, the sealed pharmaceutical containers may be cooled to the low storage temperatures described herein at rates of less than or equal to 3° C. per minute.

In embodiments, the flange 126 further comprises a transition region 144 extending between the upper surface 138 and the outer flange surface 136. In embodiments, within the transition region 144, the outer surface 116 of the glass container 102 transitions between surface profiles within the sealing region 180 (e.g., a conical surface profile) and the outer flange surface 136 (e.g., a cylindrical surface profile). The transition region 144 may take a variety of forms depending on the implementation. In embodiments, the transition region 144 comprises a corner such that the outer surface 116 directly transitions from the upper surface 138 to the outer flange surface 136. In embodiments, the transition region 144 comprises a chamfer extending at a chamfer angle from the upper surface 138. In embodiments, the transition region 144 comprises a fillet comprising a radius of curvature. As will be described in greater detail herein, the relative positioning of the transition region 144 and a sealing surface of a stopper (e.g., the stopper 106 described herein) is an important factor to ensure that the sealed pharmaceutical container 100 maintains closure integrity at relatively low storage temperatures.

Figure 1B:
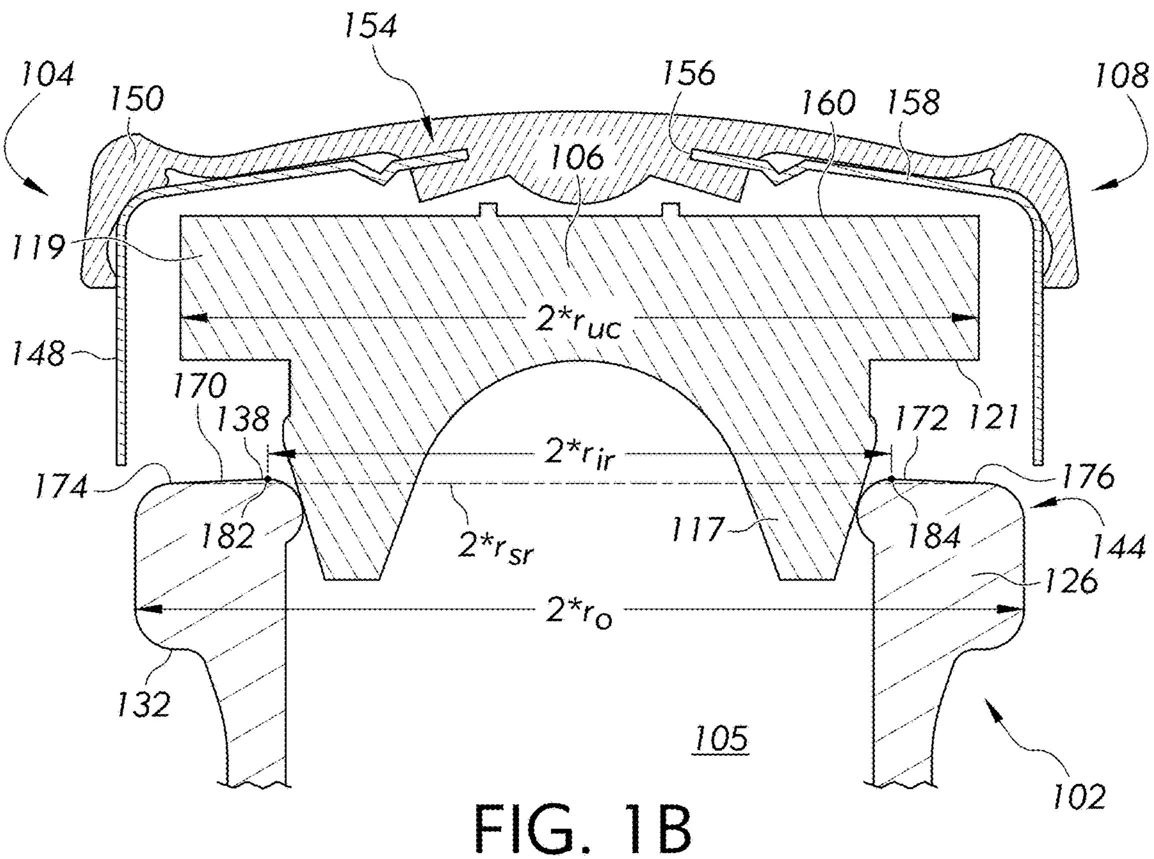
FIG. 1B schematically depicts a cross-sectional view of a portion of the sealed pharmaceutical container of FIGS. 1A, according to one or more embodiments described herein.

Referring now to FIGS. 1A and 1, in embodiments, each cross-section of the upper surface 138 of the flange 126 taken through a plane extending through and parallel to the central axis A comprises a first linear portion 170 and a second linear portion 172. The first and second linear portions 170, 172 are disposed on opposing sides of the opening 105 of the glass container 102. As depicted in FIG. 1B, the first linear portion 170 may comprise a first outer end 174 (e.g., disposed on the outer edge 142 of the upper surface 138, see FIG. 1A) and the second linear portion 172 may comprise a second outer end 176 (e.g., also disposed on the edge 142 of the upper surface 138, see FIG. 1A). The first outer end 174 and the second outer end 176 are ends of a diameter having a length equal to $2{*}r_{sr}$ of the upper surface 138. The sealing region 180 of the upper surface 138 may comprise a radius $r_{sr}$, as measured by a radial distance extending outward from and perpendicular to the central axis A to the outer edge 142 (see FIG. 1A). The radius $r_{sr}$ may correspond to a radial distance between an inner end of the transition region 144, where the outer surface 116 deviates from a conical profile followed by the upper surface 138, and the central axis A.

As depicted in FIG. 1B, the first linear portion 170 comprises a first inner end 182 and the second linear portion 172 comprises a second inner end 184. The first inner end 182 and the second inner end 184 are ends of a diameter having a length equal to $2*r_{ir}$ delineating an inner boundary of the upper surface 138. The first and second inner ends 182 and 184 may define an inner radius $r_{ir}$ of the sealing region 180. Radially inward of the first and second inner ends 182, 184, the upper surface 138 may deviate from the surface profile of the sealing region 180 and transition into the inner surface 114 (see FIG. 1A) and form an end of the opening 105.

Referring to FIGS. 1A and 1B, the sealing assembly 104 comprises a stopper 106 and a cap assembly 108. In embodiments, the stopper 106 may be constructed of a suitable elastomeric material (e.g., Butyl rubber). In embodiments, the stopper 106 may be constructed of silicone or other low $T_g$ elastomer (e.g., having a glass transition temperature $T_g$ less than or equal to −20° C., less than or equal to −30° C., or less than or equal to −40° C.), such as fluorosilicones, ethylene propylene diene monomer (EPDM) elastomers, polydimethyl siloxane (PDMS), and polybutadienes. That is, the present disclosure is not limited to stoppers constructed of a particular material.

In the embodiment depicted in FIGS. 1A and 1B, the stopper 106 comprises an insertion portion 117 and a sealing portion 119 comprising a sealing surface 121. During sealing of the glass container 102, the insertion portion 117 is inserted into the opening 105 until the sealing surface 121 contacts the upper surface 138 of the flange 126 of the glass container 102. The sealing portion 119 is then pressed against the upper surface 138 by crimping the cap assembly 108 to form a seal between the sealing surface 121 and the upper surface 138. In embodiments, the insertion portion 117 may be omitted and the stopper 106 may only include the sealing portion 119)

The cap assembly 108 is depicted to include a metallic portion 148 and a plastic portion 150. The metallic portion 148 is crimped around the underside surface 132 of the flange 126 such that an underlying portion 152 thereof contacts the underside surface 132 (see FIG. 1A). In embodiments, the length of the underlying portion 152 of the metallic portion 148 that directly contacts the underside surface 132 of the flange 126 possesses a length that is greater than or equal to 1 mm to facilitate maintenance of residual sealing force within the stopper 106 at storage temperatures of less than or equal to −80° C. In embodiments, the plastic portion 150 includes a retention feature 154 (e.g., a slot, cavity, dip, hole, or the like) receiving an inner edge 156 of the metallic portion 148 to retain an upper portion 158 of the metallic portion 148 on an upper surface 160 of the stopper 106. In embodiments, during the crimping process, the stopper 106 is inserted into the opening 105 and a compression force is applied to the metallic portion 148 during crimping. Compression of the stopper 106 generates a residual sealing force within the flange 126 that maintains compression on the stopper 106 after the metallic portion 148 is crimped into place. In embodiments, the residual seal force may vary from 5 lbf to 25 lbf, or greater than 25 lbf and result in nominal stopper strains between 5% and 19%, or higher, if the residual seal force is higher.

In embodiments, various aspects of the glass container 102 and cap assembly 108 have been designed to maintain container closure integrity at relatively low storage temperatures. For example, FIG. 1B depicts the stopper 106 in an uncompressed state prior to the cap assembly 108 being crimped to the glass container 102. As shown, the sealing portion 119 comprises an uncompressed radius $r_{uc}$. In embodiments, the stopper 106 is constructed such that the sealing portion 119 is a substantially cylindrical-shaped flange when in an uncompressed state having a radius $r_{uc}$ (at room temperature) that is less than or equal to $0.95*r_{sr}$. That is, when in an uncompressed state, the sealing portion 119 may comprise a radius $r_{uc}$ that is at most 95% of the radius $r_{sr}$ of the sealing region 180 of the outer surface 116. In embodiments, $r_{uc}$ is selected such that it is less than $r_{sr}$ and greater than or equal to $(r_{ir}+r_{sr})/2$. Such dimensions of the sealing portion 119 beneficially prevent the sealing surface 121 from contacting the transition region 144 when the sealing portion 119 is compressed against the upper surface 138 during capping, while still providing sufficient contact area to form a robust seal.

As depicted in FIG. 1A, the sealing surface 121 of the stopper 106 comprises an outer peripheral edge 164 when compressed against the upper surface 138. In embodiments, the outer peripheral edge 164 marks a transition between the sealing surface 121 and an outer surface 166 of the stopper 106 when the stopper 106 is in a compressed state. As will be appreciated, exact ending points of the various surfaces (e.g., the sealing surface 121 and the outer surface 166) of the stopper 106 described herein with respect to FIG. 1A may not exactly correspond to the shape of the stopper 106 when in an uncompressed state. As shown in FIG. 1A, as a result of the dimensions of the stopper 106 described herein (e.g., the sealing portion 119 comprising a peripheral shape that substantially corresponds to a peripheral shape of the flange 126 and comprising an uncompressed radius rue that is less than or equal to $0.85*r_{sr}$), the outer peripheral edge 164 of the sealing surface 121 is disposed radially inward of the transition region 144 on the upper surface 138. That is, the outer peripheral edge 164 is disposed on the sealing region 180 of the outer surface 116 after being compressed during capping.

Since the sealing region 180 comprises a relatively low surface roughness and is free of surface height deviations of 5.0 μm or more, such positioning of the outer peripheral edge 164 is conducive to a uniform distribution of compression at the interface between the sealing portion 119 and the upper surface 138. As a result, the dimensions of the stopper 106 described herein beneficially avoid compression of the stopper 106 being concentrated at particular points along the interface (e.g., where contact pressure between a particular segment of the sealing surface 121 and a particular segment of the upper surface 138 is more than 200% of the contact pressure at another segment at the interface). Such concentration of contact pressure may tend to reduce contact area between the sealing portion 119 and upper surface 138, increasing the probability of the seal being broken at relatively low storage temperatures.

It has been determined that the stopper 106 depicted in FIGS. 1A and 1B provides improved performance over stoppers designed to include sealing portions with radial dimensions that are comparable to that of the outer flange surface 136 of the flange 126. Such comparable dimensions may result in contact between such stoppers and the transition region 144. Through an investigation, it has been found that contact between the transition region 144 and stoppers concentrates contact pressure at the interface between the stoppers and the transition region 144, tending to reduce contact area with the upper surface 138 at relatively low storage temperatures. The stopper 106 depicted in FIGS. 1A and 1B provides the counterintuitive and unexpected result that reducing the extent of overlap between the sealing surface 121 and the flange 126 potentially increases contact area at low storage temperatures.

Figure 1C:
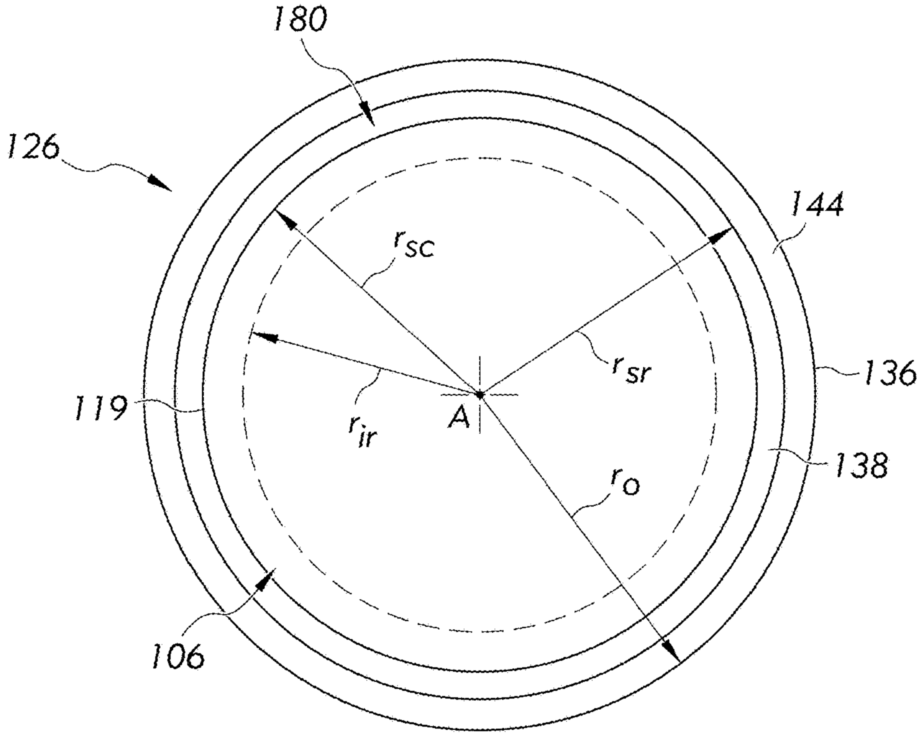
FIG. 1C schematically depicts dimensional relationships between a stopper, an upper surface of a flange, and an outer surface of the flange of the sealed pharmaceutical container of FIG. 1A, according to one or more embodiments described herein.

FIG. 1C schematically depicts the radial dimensions of the outer flange surface 136, transition region 144, and upper surface 138 of the flange 126, as well as a compressed radial dimension $r_{sc}$ of the stopper 106. The sealing region 180 may extend radially between the radial position $r_{ir}$ (e.g., containing the first and second inner ends 182 and 184 depicted in FIG. 1B) and the radial position $r_{sr}$ (e.g., containing the first and second outer ends 174 and 176 depicted in FIG. 1*i*). In embodiments, the upper surface 138 follows a conical profile between $r_{ir}$ and $r_{sr}$. The radius $r_{sr}$ may delineate an inner boundary of the transition region 144. As depicted in FIG. 1C, the compressed radial dimension $r_{sc}$ may represent a radial dimension of the sealing portion 119 when compressed against the upper surface 138 by the cap assembly 108. In embodiments, the compressed radial dimension $r_{sc}$ represents a radial distance between the central axis A and the outer peripheral edge 164 of the sealing surface 121 (see FIG. 1A) when the sealing portion 119 is in a compressed state. As will be appreciated, the compression of the sealing portion 119 may result in the sealing portion 119 comprising a non-constant radial dimension as a function of axial distance from the sealing surface 121 (see FIG. 1A). The depicted compressed radial dimension $r_{sc}$ represents the radial dimension of the sealing portion 119 that contacts, or is adjacent to, the upper surface 138. As depicted in FIG. 1C, the outer radius $r_o$ of the flange 126 (defined by the outer flange surface 136) is greater than the radius $r_{sr}$ of the sealing region 180 defined by the upper surface 138, which is still greater than the compressed radial dimension $r_{sc}$. In embodiments, the outermost point of the sealing portion 119, after being compressed by the cap assembly 108, lies radially inward of the transition region 144 to ensure a lack of contact between the sealing portion 119 and the transition region 144, irrespective of the extent that the stopper 106 is compressed via the cap assembly 108.

Figure 2:
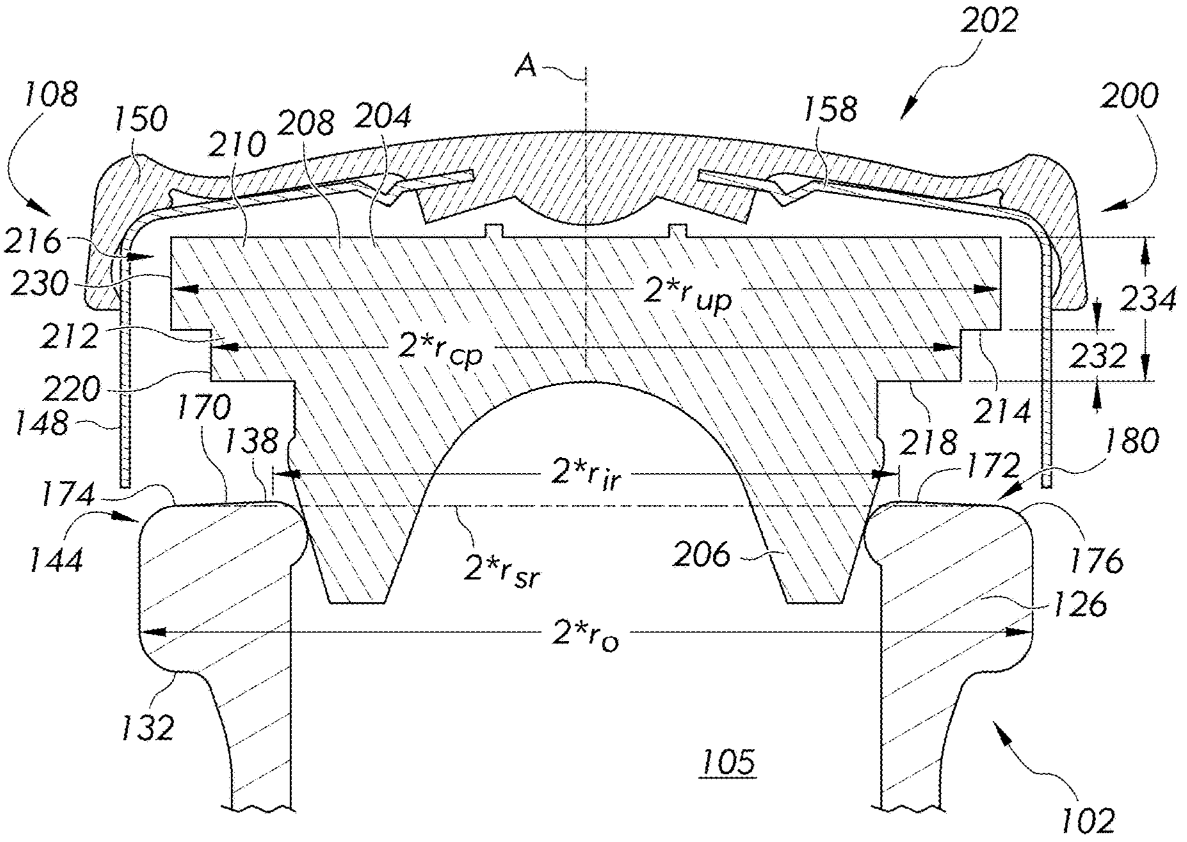
FIG. 2 schematically depicts a cross-sectional view of a portion of a sealed pharmaceutical container, according to one or more embodiments described herein.

FIG. 2 schematically depicts a portion of another sealed pharmaceutical container 200 in cross-section. The sealed pharmaceutical container 200 may include similar components as the sealed pharmaceutical container 100 described herein with respect to FIGS. 1A-1C. Accordingly, like reference numerals are included in FIG. 2 to signify the incorporation of such like components. The sealed pharmaceutical container 200 comprises a sealing assembly 202 that differs in structure from the sealing assembly 104 described herein with respect to FIGS. 1A-1C. The sealing assembly 202 comprises a stopper 204 and the cap assembly 108. The stopper 204 comprises an insertion portion 206 and a sealing portion 208. The insertion portion 206 is configured to be inserted into the opening 105 of the sealed pharmaceutical container 100, while the sealing portion 208 is compressed against the upper surface 138 of the flange 126.

In embodiments, the sealing portion 208 comprises a non-uniform radial dimension when in an uncompressed state. As depicted in FIG. 2, for example, the sealing portion 208 comprises a stepwise transition 214 in radial dimension. The stepwise transition 214 demarcates a boundary between an upper portion 210 and a contacting lower portion 212 of the sealing portion 208. While the depicted embodiment includes the stepwise transition 214 such that the contacting lower portion 212 and the upper portion 210 are distinct from one another (e.g., with each comprising a substantially uniform radial dimension), it should be understood that embodiments not including the stepwise transition 214 are contemplated and within the scope of the present disclosure. For example, in embodiments, the sealing portion 208 gradually decreases in radial dimension with proximity to the insertion portion 206. In such embodiments, at least a portion of an exterior surface 230 of the sealing portion 208 may follow a tapered or conical profile. In embodiments, the exterior surface 230 curves inward towards a geometric center of the stopper 204. In embodiments, the sealing portion 208 comprises a plurality of transitions in radial dimension such that the sealing portion 208 comprises more than two sections having different radial dimensions. In embodiments, the radial dimension of the sealing portion 208 varies as a function of axial position in accordance with a periodic or aperiodic function such that a radial dimension of the sealing portion 208 is less at a sealing surface 218 of the sealing portion 208 than where the sealing portion 208 contacts the metallic portion 148 of the cap assembly 108. A variety of different stoppers having non-uniform radial dimensions are contemplated and within the scope of the present disclosure.

In the embodiment depicted in FIG. 2, the contacting lower portion 212 contacts the upper surface 138 of the flange 126 to form a seal. The upper portion 210 may be compressed against the metallic portion 148 of the cap assembly 108 during capping of the sealed pharmaceutical container 200. As depicted in FIG. 2, as a result of the stepwise transition 214, the contacting lower portion 212, when in an uncompressed state, comprises a radial dimension $r_{cp}$ that is less than a radial dimension $r_{up}$ of the upper portion 210. In embodiments, the radius $r_{up}$ of the upper portion 210 corresponds to that associated with conventionally used stoppers of vials of the particular size of the glass container 102 (e.g., $r_{up}$ may be greater than or equal to 6.5 mm and less than or equal to 10 mm).

In embodiments, the increased radial dimension $r_{up}$ of the upper portion 210 aids in the use of existing capping processes by facilitating centering the cap assembly 108 with respect to the glass container 102 during capping. A difference in radial dimension between the sealing portion 208 and the metallic portion 148 of the cap assembly 108 may, for example, render capping more difficult by making the compression of the stopper 204 more sensitive to alignment of a capping system (not depicted) with respect to the central axis A. The upper portion 210 reduces the extent of a radial gap 216 extending between the metallic portion 148 and the stopper 204, thereby aiding in alignment of the cap assembly 108 during capping.

The radial dimension $r_{cp}$ of the contacting lower portion 212 may be selected based on similar criteria as the uncompressed radial dimension $r_{uc}$ of the sealing portion 119 of the stopper 106 described herein with respect to FIGS. 1A-1C. In embodiments, for example, $r_{cp}$ may be less than or equal to $0.85*r_{sr}$ (e.g., less than or equal to $0.80*r_{sr}$, less than or equal to $0.75*r_o$, less than or equal to $0.70*r_o$, less than or equal to $0.65*r_{or}$, less than or equal to $0.60*r_{sr}$, less than or equal to $0.55*r_o$, less than or equal to $0.50*r_{sr}$). Such a reduced radial dimension of the contacting lower portion 212 as compared to that of the sealing region 180 beneficially facilitates an outer peripheral edge 220 of a sealing surface 218 of the stopper 204 being disposed on the sealing region 180 and radially inward of the transition region 144. Such placement of the outer peripheral edge 220 may result in a uniform distribution of contact pressure after capping and aid in maintaining a high quality seal at relatively low storage temperatures.

As depicted in FIG. 2, the contacting lower portion 212 may include an axial dimension 232 when in an uncompressed state. In embodiments, the axial dimension 232 is selected to be large enough such that the stepwise transition 214 does not contact the glass container 102 after the stopper 204 is compressed during capping. In embodiments, the axial dimension 232 is greater than or equal to 10% of an axial dimension 234 of the sealing portion 208 (e.g., greater than or equal to 15%, greater than or equal to 20%). Such an axial dimension 232 may beneficially prevent the stepwise transition 214 from contacting the upper surface 138 of the flange 126, which may cause deformation of the sealing portion 208 and disrupt the contact area thereof.

Figure 3A:
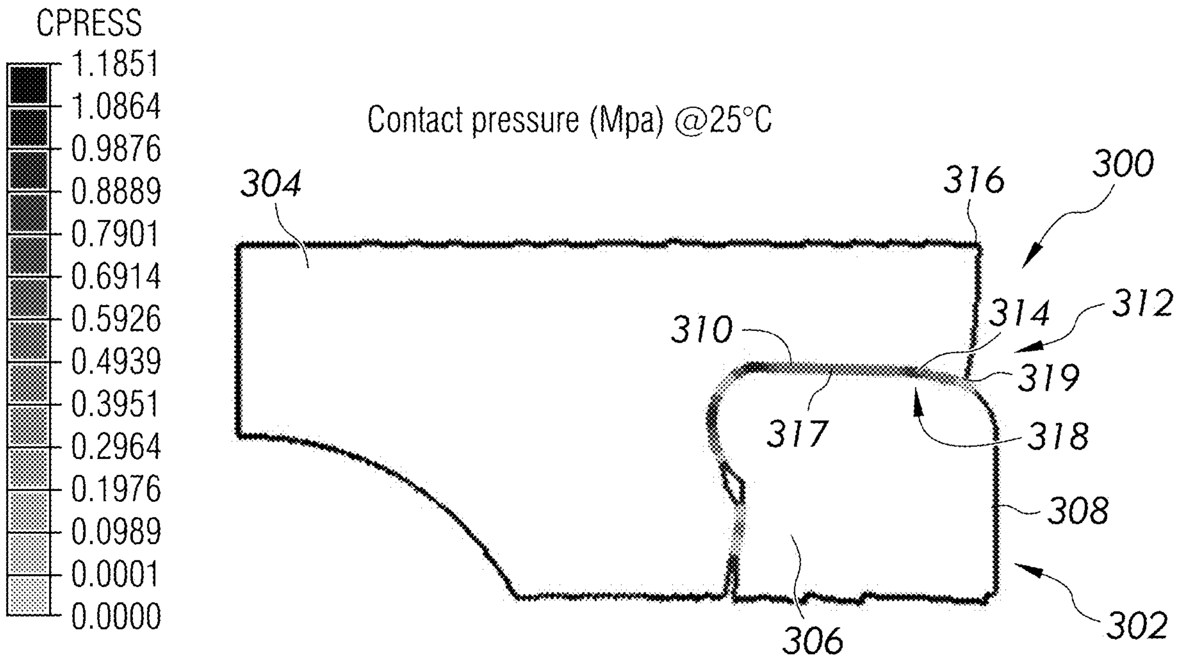
FIG. 3A depicts simulation results a first stopper compressed against a flange of a first glass container when at a temperature of 25° C., according to one or more embodiments described herein.
Figure 3B:
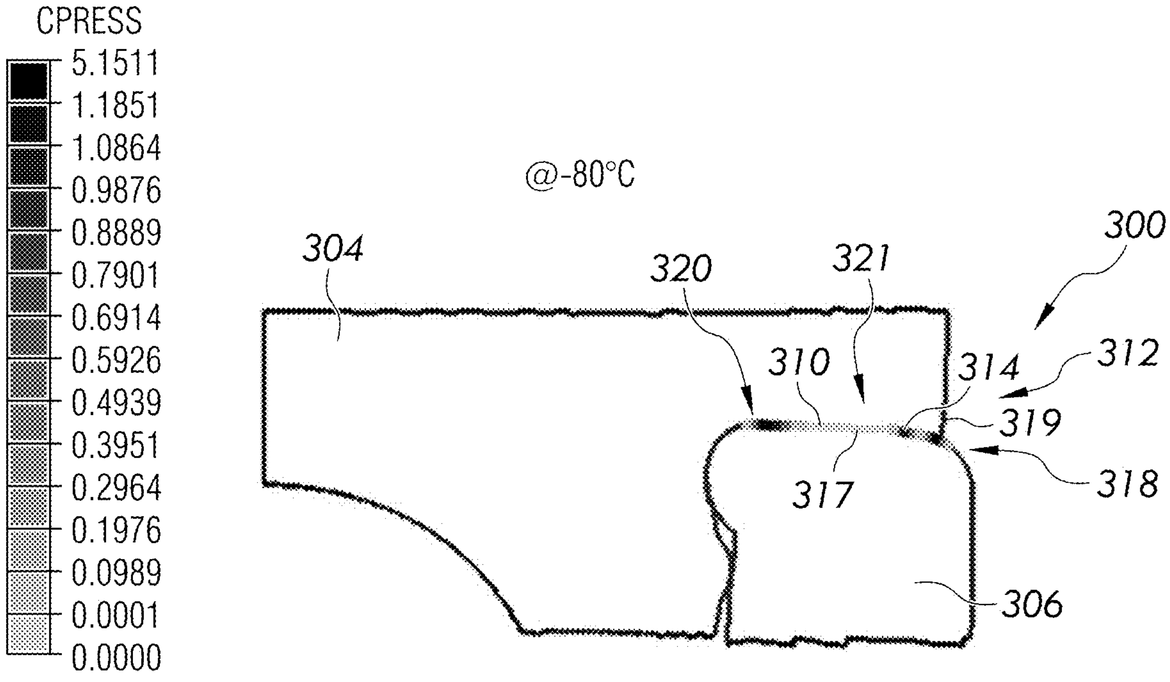
FIG. 3B depicts simulation results of the first stopper compressed against the flange of the first glass container of FIG. 3A when at a temperature of −80° C., according to one or more embodiments described herein.
Figure 3C:
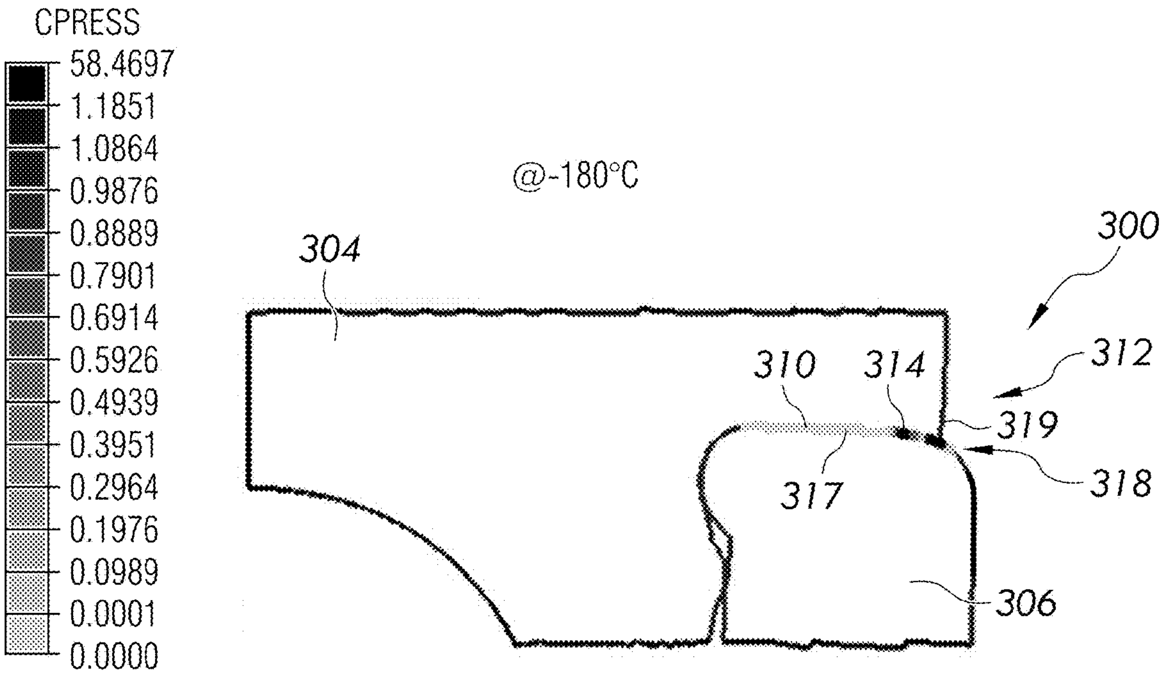
FIG. 3C depicts simulation results of the first stopper compressed against the flange of the first glass container of FIG. 3A when at a temperature of −180° C., according to one or more embodiments described herein.

FIGS. 3A-3C depict simulation results of the performance of a sealed pharmaceutical container 300, according to an example embodiment of the present disclosure. The sealed pharmaceutical container 300 is depicted to include a glass container 302 and a stopper 304. The stopper 304 is crimped against a flange 306 of the glass container 302 via a cap assembly (not depicted) that is similar in structure to the cap assembly 108 described herein with respect to FIGS. 1A-1C. The flange 306 is depicted to include an outer surface 308, an upper surface 310, and a transition region 312 extending between the outer surface 308 and the upper surface 310. In embodiments, the upper surface 310 is similar in structure to the upper surface 138 of the flange 126 described herein with respect to FIGS. 1A-1C and defines a conical region. The transition region 312 is depicted to comprise a fillet where the exterior surface of the glass container 302 curves in transition between the outer surface 308 and the upper surface 310. The transition region 312 is depicted to include an inner end 314 that delineates an outer peripheral edge of the upper surface 310. As depicted in FIG. 3A, the stopper 304 is constructed such that, after being compressed against the upper surface 310, the stopper comprises an outer surface 316 that is greater in size than that of the conical region defined by the upper surface 310 of the flange 306. As a result, a sealing surface 317 of the stopper 304 comprises an outer peripheral edge 319 that is disposed on the transition region 312.

The simulations depicted in FIGS. 3A-3C predict the compression of the stopper 304 against the flange 306 when crimped via the cap assembly (not depicted) to provide a residual sealing force of approximately 25 lbf (e.g., greater than or equal to 24.7 lbf and less than or equal 25.6 lbf). Finite element analysis was then performed to simulate the cooling process. In the cooling process, the pharmaceutical container 300 and stopper 304 were cooled to −80° C. and −180° C. at a cooling rate of 1° C./min. The contact status of the stopper 304 against the flange 306 at 25° C., −80° C., and −180° C., respectively, are depicted to show the seal status. As depicted in FIG. 3A, when at 25° C., the compression of the stopper 304 results in a continuous contact area covering an entirety of the upper surface 310, indicating an effective sealing of the glass container 302 at that temperature. However, as shown in the simulation results, the contact pressure is non uniform at the inner end 314 of the transition region 312, and comprises a first peak region 318. As depicted in FIG. 3B, when the sealed pharmaceutical container is cooled to −80° C., the contact pressure between the stopper 304 and the flange 306 comprises a non-uniform radial distribution. The contact pressure comprises the first peak region 318 extending radially outward from the inner end 314 of the transition region 312 and a second peak region 320 offset from the first peak region 318 (e.g., at an inner edge of the upper surface 310). As such, there is a region 321 of relatively low contact pressure along the upper surface 310 extending between the first peak region 318 and the second peak region 320. Without wishing to be bound by theory, it is believed that the region 321 results from deformation of the stopper 304 from the contact between the sealing surface 317 and the transition region 312 (e.g., as a result of the stopper 304 bending around the inner end 314 when compressed against the flange 306). The region 321 of relatively low contact pressure may indicate a diminished contact area between the stopper 304 and the flange 306 as compared to when the temperature is 25° C., increasing the probability of container closure integrity failure at −80° C. As depicted in FIG. 3C, the contact area is reduced even more when the sealed pharmaceutical container 300 is cooled to −180° C. The second peak region 320 that was present in the contact pressure distribution at −80° C. is not present at −180°. Without wishing to be bound by theory, this may be due to volumetric shrinkage of the stopper 304 and the reduced shape recovery capability of the stopper 304 due to the temperature being beneath a glass transition temperature thereof. It is believed that the non-uniform contact pressure distribution, including the first peak region 318 of relatively high contact pressure on the transition region 312, contributes to reduced contact area at low storage temperatures as a result of deformation of the stopper 304.

Figure 4A:
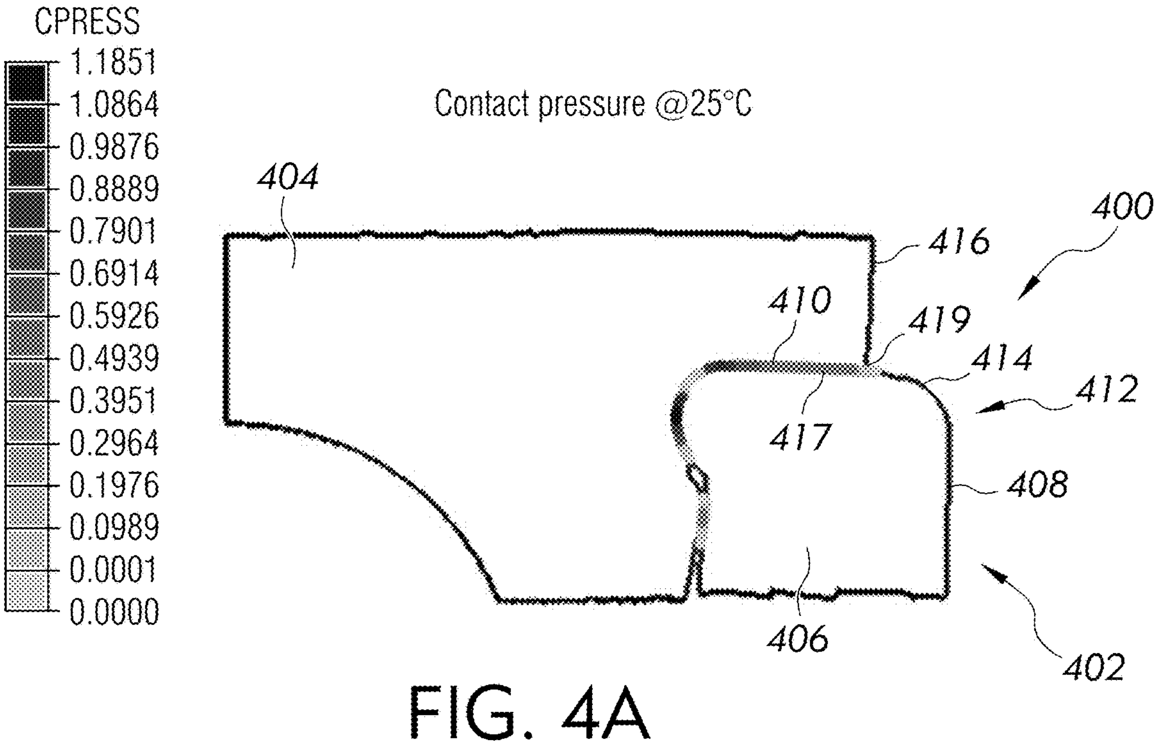
FIG. 4A depicts simulation results a second stopper compressed against a flange of a second glass container when at a temperature of 25° C., according to one or more embodiments described herein.
Figure 4B:
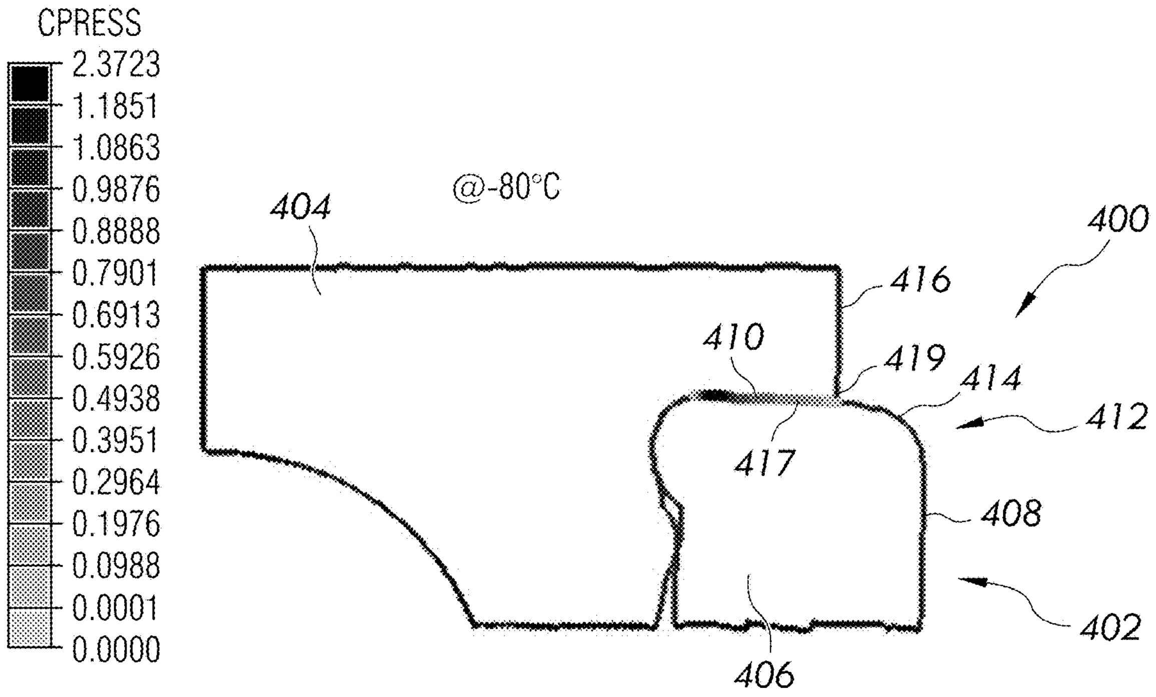
FIG. 4B depicts simulation results of the second stopper compressed against the flange of the second glass container of FIG. 4A when at a temperature of −80° C., according to one or more embodiments described herein.
Figure 4C:
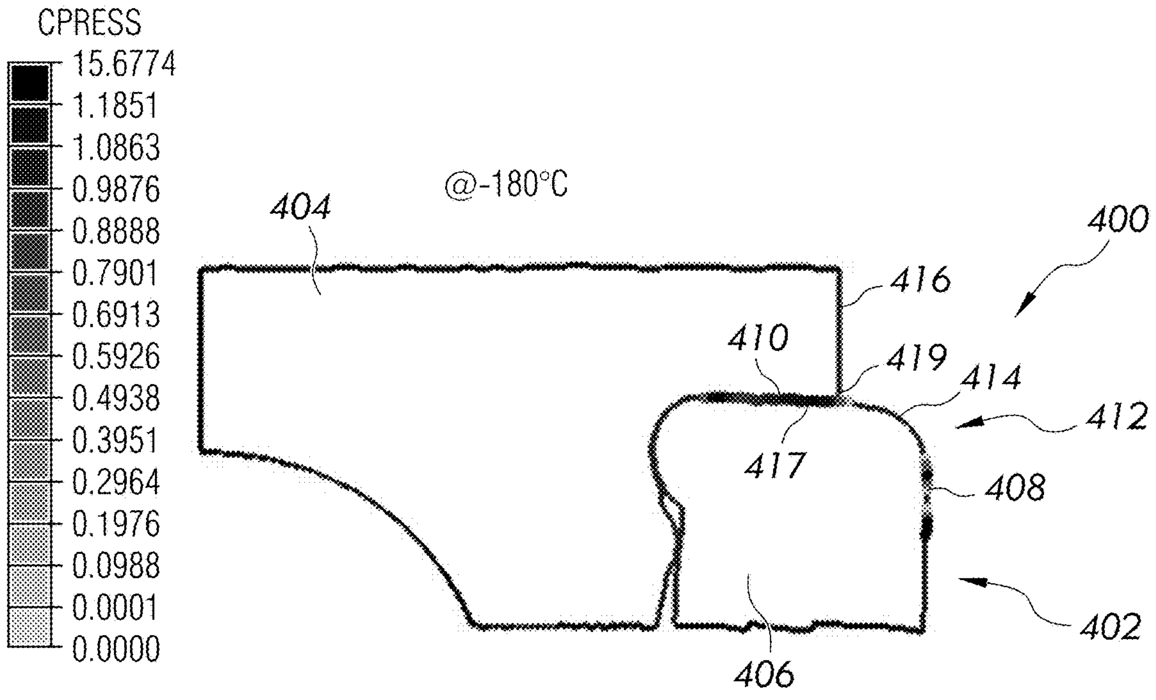
FIG. 4C depicts simulation results of the second stopper compressed against the flange of the second glass container of FIG. 4A when at a temperature of −180° C., according to one or more embodiments described herein.

FIGS. 4A-4C depict simulation results of the performance of a sealed pharmaceutical container 400, according to an example embodiment of the present disclosure. The sealed pharmaceutical container 400 is depicted to include a glass container 402 and a stopper 404. The stopper 404 is crimped against a flange 406 of the glass container 402 via a cap assembly (not depicted) that is similar in structure to the cap assembly 108 described herein with respect to FIGS. 1A-1C. The flange 406 is depicted to include an outer surface 408, an upper surface 410, and a transition region 412 extending between the outer surface 308 and the upper surface 410. In embodiments, the upper surface 410 is similar in structure to the upper surface 138 of the flange 126 described herein with respect to FIGS. 1A-1C and defines a conical region. The transition region 312 is depicted to comprise a fillet where the exterior surface of the glass container 402 curves in transition between the outer surface 408 and the upper surface 410. The transition region 412 is depicted to include an inner end 414 that delineates an outer peripheral edge of the upper surface 410. As depicted in FIG. 4A, the stopper 404 is constructed such that, after being compressed against the upper surface 410, the stopper 404 comprises an outer surface 416 that comprises a radial dimension that is less than that associated with the upper surface 410. As a result, an outer peripheral edge 419 of a sealing surface 417 of the stopper 404 may be disposed on the upper surface 410 after compression.

The simulations depicted in FIGS. 4A-4C predict the compression of the stopper 404 the flange 406 when crimped via the cap assembly (not depicted) to provide a residual sealing force of approximately 17 lbf. Finite element analysis was then performed to simulate compression of the stopper 404 against the flange 406 at 25° C., −80° C., and −180° C., respectively. As depicted in FIG. 4A, at 25° C. the contact pressure between the sealing surface 417 and the upper surface 410 is predicted to be relatively uniform across an entirety of the upper surface 410, indicating a high quality seal. In contrast to the stopper 304 depicted in FIG. 3A, compression of the stopper 404 against the flange 406 does not result in any contact pressure peaks on the upper surface 410. Without wishing to be bound by theory, it is believed that the uniform contact pressure distribution is a result of the sealing surface 417 not contacting or extending over the transition region 412, which may result in the stopper 404 deviating in shape from the upper surface 410, especially at relatively low storage temperatures.

As depicted in FIGS. 4B-4C, the contact area between the stopper 404 and the flange 406 remains relatively consistent even when the sealed pharmaceutical container is cooled to −80° C. and −180°, respectively. The contact pressure between the stopper 404 and flange 406 is greater than 0.0001 MPa over substantially the entirety of the upper surface 410, without the gaps present with the stopper 304 described with respect to FIGS. 3A-3C. As depicted in these simulation results, avoiding contact between the sealing surface 417 and the transition region 412 beneficially provides a more uniform distribution of contact pressure than the case of the stopper 303 described herein with respect to FIGS. 3A-3C, where the sealing surface 317 contacted the transition region 412. These results demonstrate the efficacy of the stoppers described herein in providing more robust seals that more likely to maintain container closure integrity at low storage temperatures than certain existing stoppers.

Figure 5:
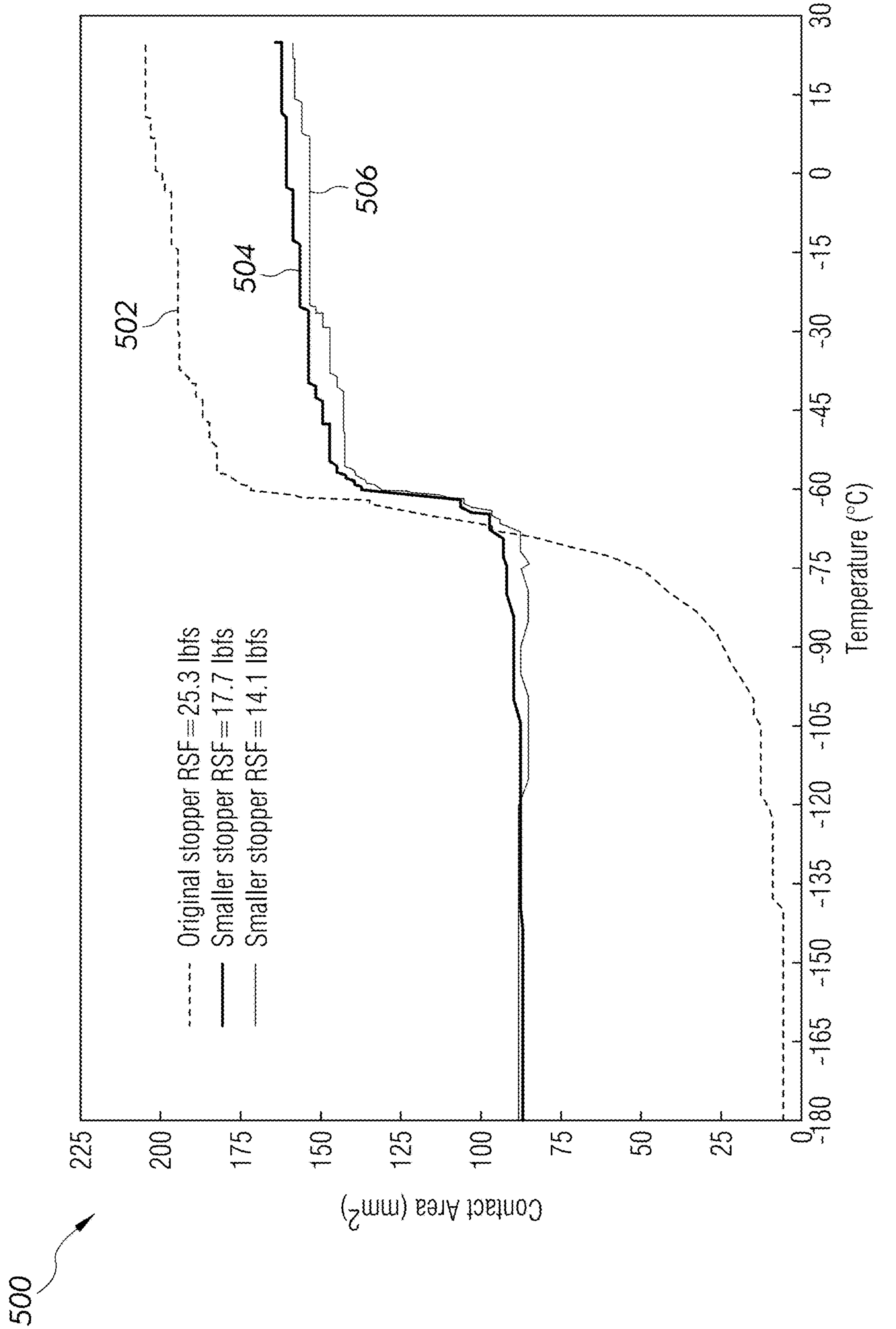
FIG. 5 depicts a plot of contact areas between the first and second stoppers and first and second glass containers of FIGS. 3A-4C at a plurality of different temperatures, according to one or more embodiments described herein.

FIG. 5 depicts a plot 500 of a simulation of the performance of the stoppers 304 and 404 described herein with respect to FIGS. 3A-4C being cooled to various storage temperatures with the stoppers 304 and 404 described herein being crimped against the upper surfaces 310 and 410 using cap assemblies (not depicted). In the simulations conducted to generate the plot 500, the flanges 306 and 406 comprised 13 mm outer diameters. The stopper 304 was crimped against the upper surface 310 to provide a residual seal force of 25.1 lbfs. Two simulations of the stopper 404 were conducted with residual seal forces of 17.7 lbfs and 14.1 lbfs. The trace 502 depicts the simulation results for the stopper 304, while the traces 504 and 506 depict the simulation results for the stopper 404 crimped against the upper surface 410 to provide residual seal forces of 17.1 lbfs and 14.1 lbfs, respectively. As depicted in the plot 502, the stopper 304 provides a contact area above 175 $mm^2$ at temperatures greater than −75° C. and a contact area of approximately 200 $mm^2$ at room temperature. At temperatures less than −75° C., however, this contact area is reduced to beneath 25 $mm^2$, and beneath 20 $mm^2$ at temperatures less than −120° C. Such results indicate a relatively high likelihood of container closure integrity failure at temperatures of less than or equal to −80° C.

As depicted in FIG. 5, the stopper 404 provided a slightly lower contact area at room temperature (of approximately 150 $mm^2$), which was expected due to the reduced radial dimension and the lesser residual sealing forces used. At temperatures less than −75° C., however, the contact area remains above 75 $mm^2$. Both residual seal forces resulted in a relatively consistent contact area of approximately 80 $mm^2$ at temperatures less than or equal to −80° C. For the stopper 404, a ratio of the contact area or seal surface area at −80° C. to that at room temperature was greater than 63%. This significantly contrasts with the results obtained by the stopper 304, where such a ratio was smaller than 5% (e.g., approximately 4.4%). In embodiments, the contact area between the stopper 404 and flange 406 is maintained at greater than or equal to 10% of a surface area of the upper surface 410, irrespective of the storage temperature. In embodiments, the contact area is maintained at greater than or equal to 75 $mm^2$ at temperatures less than or equal to −80° C. or −180° C. Such contact areas significantly increases the probability of maintaining container closure integrity at low storage temperatures over the stopper 304 depicted in FIGS. 3A-3C. Such results indicate the efficacy of the stoppers described herein. Additionally, the stopper 404 provides such performance improvements with less stopper compression (indicated by the reduced residual seal forces). As such, the stoppers of the present disclosure may facilitate capping of pharmaceutical containers using simplified capping processes than those used in current assemblies, thereby providing production efficiencies.

In view of the foregoing description, it should be understood that sealed glass containers capable of maintaining container closure integrity at storage temperatures of less than or equal to −70° C. are disclosed. Improved seals may be achieved entirely through structuring stoppers used to seal glass containers to avoid contact with non-conical regions of the outer surfaces of the glass containers. By avoiding contact between the stopper and a transition region (e.g. a chamfer, a flange, a corner) on the outer surfaces of the glass containers, a uniform distribution of contact pressure may be achieved, which may facilitate maintenance of relatively high contact areas at low storage temperatures.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A sealed pharmaceutical container comprising:
- a shoulder;
- a neck extending from the shoulder; and
- a flange extending from the neck, the flange comprising:
  - an underside surface extending from the neck;
  - an outer surface extending from the underside surface, the outer surface defining an outer radius $r_o$ of the flange; and
  - an upper surface extending between the outer surface and an inner surface defining an opening in the sealed pharmaceutical container, wherein the upper surface comprises:
    - a sealing region extending between the opening and the outer surface, wherein the sealing region comprises a radius $r_{sr}$ that is less than $r_o$; and
    - a transition region extending between the sealing region and the outer surface; and
- a sealing assembly comprising:
  - a stopper comprising an insertion portion inserted into the opening and a sealing portion in contact with the upper surface at a lower surface of the sealing portion, wherein the sealing portion comprises a stepwise transition in a radial dimension at a location that is axially offset from the upper surface; and a cap compressing the stopper against the upper surface, wherein the sealing portion of the stopper comprises a compressed radius $r_{sc}$ that is less than $r_{sr}$ adjacent the upper surface.

2. The sealed pharmaceutical container of claim 1, wherein the sealing portion comprises a sealing surface that is disposed on the sealing region of the upper surface, the sealing surface comprising at least a portion that conforms in shape to the sealing region as a result of the cap compressing the stopper against the upper surface.

3. The sealed pharmaceutical container of claim 2, wherein the sealing surface comprises an outer peripheral edge that is disposed radially inward of the transition region on the sealing region and that is disposed radially outward of an inner edge of the sealing region.

4. The sealed pharmaceutical container of claim 1, wherein the compression is maintained on the upper surface when the sealed pharmaceutical container is cooled to a temperature of less than or equal to −45° C. such that a helium leakage rate of the sealed pharmaceutical container is less than or equal to $1.4\times10^{-6}$ $cm^3/s$ at the temperature.

5. The sealed pharmaceutical container of claim 4, wherein the stopper is compressed against the upper surface by the cap such that the stopper applies a residual seal force to the upper surface that is less than 20 lbfs.

6. The sealed pharmaceutical container of claim 1, wherein a second contact area between the sealing portion and the upper surface when the sealed pharmaceutical container is cooled to −80° C. is at least about 10% of a first contact area between the sealing portion and the upper surface when the sealed pharmaceutical container is at room temperature.

7. The sealed pharmaceutical container of claim 1, wherein a second contact area between the sealing portion and the upper surface when the sealed pharmaceutical container is cooled to −180° C. is greater than or equal to 10.0% of a first contact area between the sealing portion and the upper surface when the sealed pharmaceutical container is at room temperature.

8. The sealed pharmaceutical container of claim 1, wherein the sealing portion of the stopper comprises:

a contacting lower portion that contacts the upper surface of the flange; and an upper portion that directly contacts the cap, wherein:

the upper portion comprises a radial dimension $r_{up}$ that is greater than the compressed radius $r_{sc}$ such that at least a portion of the upper portion extends axially over the transition region, and the contacting lower portion comprises a radial dimension that is less than $r_{up}$.

9. The sealed pharmaceutical container of claim 1, wherein:

the outer radius $r_o$ of the flange equals 6.5 mm, and a contact area between the upper surface and the sealing portion is greater than or equal to 75 $mm^2$ when the sealed pharmaceutical container is cooled to a temperature of less than or equal to −80°.

10. A sealed pharmaceutical container comprising:

a central axis;

an opening;

a shoulder;

a neck extending from the shoulder;

a flange circumferentially surrounding the opening, the flange comprising:

an underside surface extending from the neck;

an outer surface extending from the underside surface, the outer surface defining an outer radius $r_o$ of the flange;

an upper surface, wherein, in a cross-section of the sealed pharmaceutical container taken through a plane extending parallel to and through the central axis, the upper surface comprises a first linear section disposed on a first side of the opening and a second linear section disposed on the second side of the opening, wherein outer ends of the first and second linear sections are disposed a distance $2*r_{sr}$ apart from one another in a direction perpendicular to the central axis; and a transition region extending between the upper surface and the outer surface; and a sealing assembly comprising:

a stopper comprising an insertion portion inserted into the opening and a sealing portion in contact with the upper surface, wherein the sealing portion comprises a stepwise transition in a radial dimension at a location that is axially offset from the upper surface; and a cap compressing the stopper against the upper surface, wherein the sealing portion comprises a compressed radius $r_{sc}$ that is less than $r_{sr}$ adjacent the upper surface.

11. The sealed pharmaceutical container of claim 10, wherein the first and second linear sections of the cross section extend at angles relative to a plane extending perpendicular to the central axis and are portions of a conical section of the upper surface.

12. The sealed pharmaceutical container of claim 10, wherein the sealing portion comprises a sealing surface that is disposed on the first and second linear sections.

13. The sealed pharmaceutical container of claim 12, wherein the sealing surface comprises an outer peripheral edge that is disposed radially inward of the transition region and that is disposed radially outward of inner ends of the first and second linear sections.

14. The sealed pharmaceutical container of claim 10, wherein the compression is maintained on the upper surface when the sealed pharmaceutical container is cooled to a temperature of less than or equal to −45° C. such that a helium leakage rate of the sealed pharmaceutical container is less than or equal to $1.4\times10^{-6}$ $cm^3/s$ at the temperature.

15. The sealed pharmaceutical container of claim 14, wherein the stopper is compressed against the upper surface by the cap such that the stopper applies a residual seal force to the upper surface that is less than 20 lbfs.

16. The sealed pharmaceutical container of claim 10, wherein a second contact area between the sealing portion and the upper surface when the sealed pharmaceutical container is cooled to −80° C. is at least about 10% of a first contact area between the sealing portion and the upper surface when the sealed pharmaceutical container is at room temperature.

17. The sealed pharmaceutical container of claim 10, wherein a second contact area between the sealing portion and the upper surface when the sealed pharmaceutical container is cooled to −180° C. is greater than or equal to 10.0% of a first contact area between the sealing portion and the upper surface when the sealed pharmaceutical container is at room temperature.

18. The sealed pharmaceutical container of claim 10, wherein the sealing portion of the stopper comprises:

a contacting lower portion that contacts the upper surface of the flange; and an upper portion that directly contacts the cap, wherein:

the upper portion comprises a radial dimension $r_{up}$ that is greater than the compressed radius $r_{sc}$ such that at least a portion of the upper portion extends axially over the transition region, and the contacting lower portion comprises a radial dimension that is less than $r_{up}$.

19. The sealed pharmaceutical container of claim 10, wherein:

the outer radius $r_o$ of the flange equals 6.5 mm, and a contact area between the upper surface and the sealing portion is greater than or equal to 75 $mm^2$ when the sealed pharmaceutical container is cooled to a temperature of less than or equal to −80°.

* * * * *